March 6, 1945.  A. W. MOLINARE  2,370,744
FERTILIZER DISTRIBUTOR
Filed Feb. 3, 1944  2 Sheets—Sheet 1

Inventor:
Anthony W. Molinare
By: Bair & Freeman
Attorneys

March 6, 1945.  A. W. MOLINARE  2,370,744
FERTILIZER DISTRIBUTOR
Filed Feb. 3, 1944  2 Sheets-Sheet 2
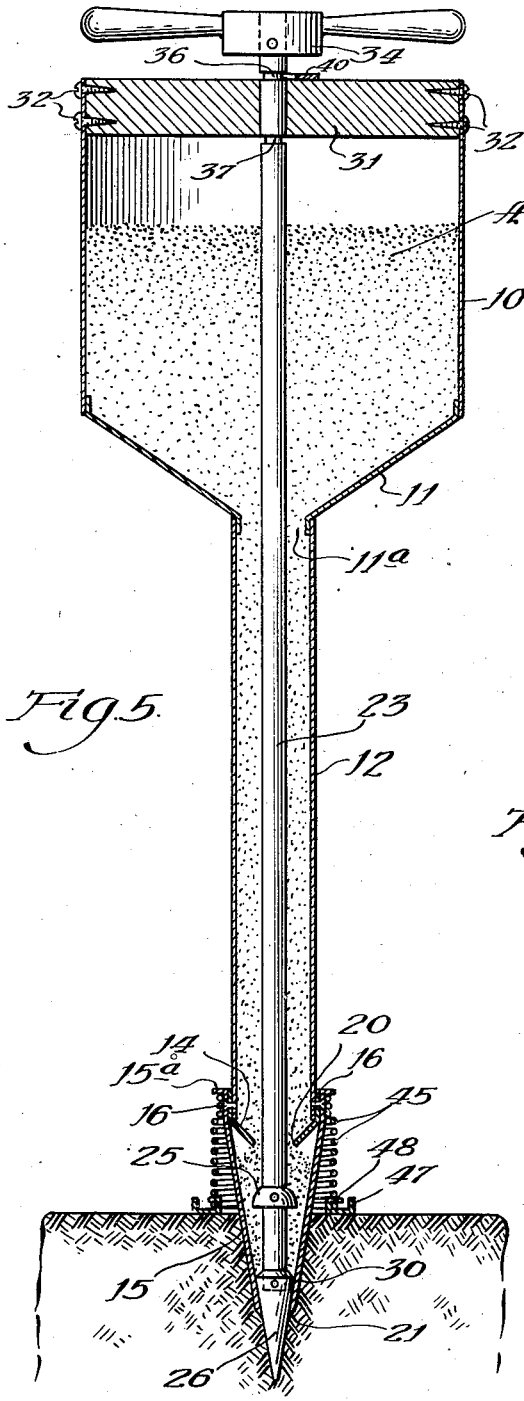
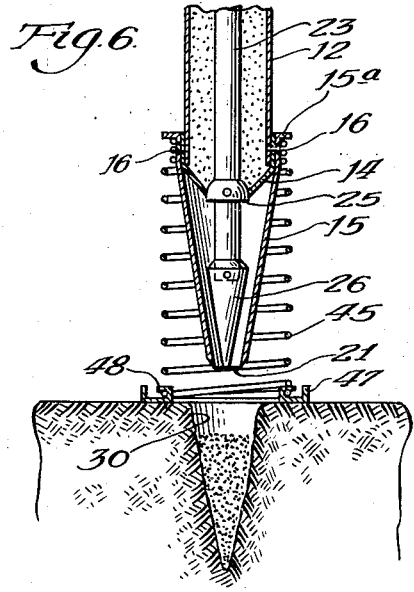
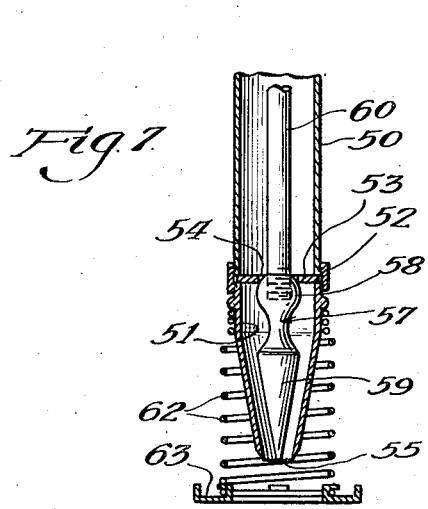
Inventor
Anthony W. Molinare
By: Bair & Freeman
Attorneys Patented Mar. 6, 1945

2,370,744

UNITED STATES PATENT OFFICE 2,370,744

FERTILIZER DISTRIBUTOR

Anthony W. Molinare, Wilmette, Ill.

Application February 3, 1944, Serial No. 520,957

4 Claims. (Cl. 111—96)

This invention relates to distributing implements of the hand operated type, and more particularly to implements for handling or dispensing flowable, granular types of materials, fertilizers and the like, such as so-called commercial fertilizers, for example, "Vigoro," "Millorganite" and numerous others now available, or various other granular forms of materials, such as bone meal, phosphates, lime, etc.

The implement embodying the present invention is suitable for fertilizing trees, shrubs and plants, and is also adapted for general garden uses. One extensively used method of fertilizing trees, shrubs and plants consists in forming, by a suitable implement, several holes in the ground around the base or trunk of the tree or shrub, and then filling the holes with fertilizer or other suitable treating materials, the number of holes and the quantity of fertilizer used in each hole depends upon the nature of the fertilizer employed, as well as upon the size and nature of the tree or shrub being treated. Where a large number of trees or shrubs are to be treated with fertilizer or other like material the task becomes extremely laborious and time consuming, necessitating a substantial amount of various physical exertions, such as bending, kneeling and twisting. Moreover, in fertilizing certain types of trees and shrubs of the types having thorns or sharp needles, great care must be exercised in order to avoid bodily injury.

One of the objects of this invention is to provide a novel implement of the character indicated which is constructed and arranged so as to be utilized by a person in a standing or upright position for first forming a suitably located hole in the ground, by application of downward pressure on the implement, and then by lifting the implement in an upwardly direction effecting the discharge of a measured quantity of fertilizer into the formed hole.

Another object is to provide a novel implement of the character indicated, having a resilient foot adapted for engaging the ground for partially supporting the implement preparatory to application of a downward pressure for forming a hole in the ground, and wherein said resilient foot serves to assist in removing the implement from the hole formed in the ground upon removal of said downward pressure.

A further object is to provide a novel implement of the character indicated which permits quick and easy application of measured quantities of granular fertilizer and the like to the ground, adjacent the base or trunk of a tree, shrub or plant.

Still another object is to provide a novel implement of the character indicated which is simple in construction, durable and effective in operation, and capable of being economically manufactured.

Other objects and advantages of this invention will be apparent from the following description, taken in connection with the accompanying drawings in which—

Figure 5 is a vertical sectional view, similar to Figure 1, showing the parts in an operating position, and the implement projected into the ground, forming a hole therein.

Figure 6 is a fragmentary view of the lower position of the implement, showing the parts of the implement in their initial position of adjustment, after the discharge of a measured quantity of granular material into the hole formed in the ground.

Figure 7 is a fragmentary vertical sectional view of the lower portion of an implement of modified form.

Figure 1:
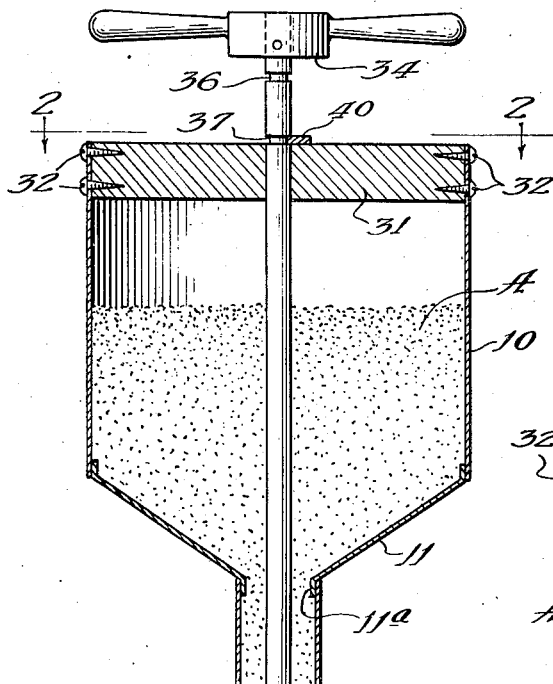
Figure 1 is a vertical section through the implement embodying the present invention, showing the movable parts latched in a fixed position.

The implement embodying the present invention and as represented in the drawings, includes storage hopper 10, for granular material indicated at A, having a downwardly tapered bottom wall 11, provided adjacent its center with an annular neck 11a, to which is rigidly attached, as by welding, a downwardly extending tubular spout 12. Attached to the lower end of the spout 12 is a valve seat element 14, having an upright wall snugly fitting around the lower end of said spout 12. Snugly fitted around said upright wall of the valve element 14 is the upper end of a chambered body member 15, of generally frustoconical formation, the lower end of which is formed to constitute a valve seat. The members 14 and 15 are fixedly secured to the lower end of the spout 12 by means of screws 16. The upper end of the body member 15 terminates in a transverse flange 15a, the purpose of which will be hereinafter described. The interior of the body 15 constitutes a measuring chamber for granular material such as fertilizer, and each measured quantity of material is discharged in totality as a "shot," incident to operation of the implement.

The valve seat element 14 is provided with a central port opening, indicated by the reference character 20, and the lower end of the chambered body 15 is formed with an aligned port opening represented by the reference character 21. Cooperating with the ports of the respective valve seats is a dual set of valve elements mounted on the lower end of a vertically reciprocable, manually operated rod 23, which extends substantially centrally through the hopper 10, spout 12, and into the chambered body 15. The valve means includes a valve element 25, fixedly secured on the lower portion of the rod 23, and formed for cooperative engagement with the port 20 of the valve seat element 14. Fixedly secured on the extreme lower end of said rod is a cone-shaped valve element 26, adapted to cooperate with the port 21 formed in the lower end of the chambered body 15, as may be seen in the drawings. The valve element 26 is so formed that when disposed in sealing relation to the port 21, as clearly seen in Figure 3 of the drawings, a substantial portion of said valve element projects exteriorly of and below the lower end of the chambered body 15, and in effect constitutes a continuation of the tapered wall of the chambered body 15, thus the projecting portion of the valve element 26, and the lower portion of the wall of the chambered body 15, constitutes a tapered, sharp pointed cone, as seen in Figure 5 of the drawings, which permits the implement being conveniently projected into the ground to form a conical hole therein, as indicated at 30.

The upper end of the rod 23 is slidably guided in a transverse member 31 which is rigidly secured at its ends to the wall of the hopper 10 by means of screws 32, and the lower end of said rod is confined in the port opening 25 of the valve element 14. The upper end of the rod extends a suitable distance above the guide member 31, and is provided at its upper end with a suitable hand grip 34, by means of which the rod together with the valve assembly is adapted to be reciprocably moved with respect to the hopper and other parts of the implement.

The upper portion of the rod 23 is provided with two vertically spaced apart circumferential grooves 36 and 37, with the spacing therebetween corresponding to the range of movement of the rod with the valve elements disposed in either of its two positions, as indicated respectively in Figures 1 and 5 of the drawings.

Figure 2:
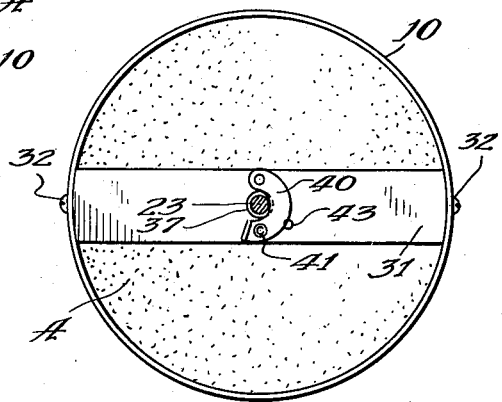
Figure 2 is a transverse sectional view, taken substantially as indicated at line 2—2 on Figure 1, showing the finger latch in an operative position of adjustment.
Figure 3:
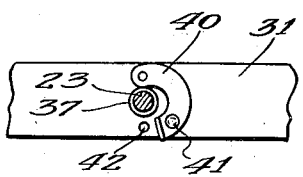
Figure 3 is a fragmentary view showing the finger latch in an inoperative position of adjustment.
Figure 4:
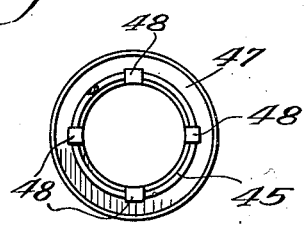
Figure 4 is a transverse sectional view through the resilient foot of the implement, taken substantially as indicated at line 4—4 on Figure 1.

Pivotally mounted on the top of the guide member 31, adjacent the rod, is a finger operated latch 40, having a detent 41 adapted to seat in either of two apertures indicated at 42 and 43 formed in the top of said guide member 31. When either of the annular grooves 36 and 37 registers with the latch, and which will correspond with the valve mechanism assuming either of its two main positions of adjustment, the finger latch may be moved to the position as seen in Figures 1 and 2 of the drawings in which position it projects into one of the annular grooves for releasably locking the rod 23 and valve assembly at one of its respective positions of adjustment. The purpose of the latch is to permit locking the valve assembly in fixed relation so that the implement may be conveniently carried from place to place by the hand piece 34, without possibility of accidental discharge of the granular material from the implement. It is to be understood that when using the implement the latch 40, is disengaged and is disposed in the position as seen in Figure 3 of the drawings.

Mounted on the chambered body 15, in surrounding relation, is a resilient foot comprising a coil spring 45, the upper end of which is closely wound and frictionally secured around the exterior of the upper end of the body member 15, in abutting relation to the transverse flange 15a. The lower end of the spring is rigidly connected to an annular, flanged, ground engaging member 47, by means of a plurality of tangs 48. The member 47 is adapted to be seated upon the ground, and by means of the spring 45, the implement is totally or partially supported in proper position, preparatory to operating the valve means by downward movement of the rod 23, prior and incident to the formation of the hole 30, in the ground.

Operation

In using the implement the hand grip 34 is drawn upwardly to dispose the valve means in the position as seen in Figure 1 of the drawings. For convenience in maintaining such relationship of the valve means, the latch member 40 may be moved into operative latching engagement with the rod 23. The hopper 10 is then filled with suitable granular material as indicated at A, which immediately flows downwardly into and filling the spout 12. The implement may then be carried to the place of use and is totally supported by the hand grip 34. The latch 40 is then disengaged and the implement is then lowered to cause its resilient foot to seat upon the ground as seen at Figure 1, at a proper location with respect to the base or trunk of the tree or shrub to be treated. Downward pressure is then exerted upon the hand grip 34, for moving the rod 23 to cause the valve element 25 to move out of sealing engagement with respect to its cooperating port 20, and simultaneously the cone valve 26 is projected downwardly, closing its cooperating port 21, and the granular material A then flows from the spout 12 into the measuring chamber of the chambered body 15 as seen in Figure 5 of the drawings. As above stated, such downward movement of the valve assembly causes the lower portion of the valve 26 to project through and beyond the lower end of the chambered body 15, which projecting portion together with the lower portion of the chambered body 15 is forced into the ground to form the cone shaped hole 30 therein, as seen in Figures 5 and 6. Such downward movement is transmitted by valve element 26 to the implement proper and results in collapsing of the supporting spring 45, as clearly seen in Figure 5 of the drawings. As soon as the hole is formed of proper depth the operator then lifts upwardly on the hand grip 34, with a quick action, and causes the valve element 25 to again close the port 20, and causes the valve element 26 to move to open position with respect to its cooperating port 21, and thereby immediately effects discharge of the measured quantity of the granular material, formerly in said chambered body 15, into the hole 30, formed in the ground. As soon as the downward pressure on the hand grip is relieved, the energy built up in the springs 45, tends to raise the implement with respect to the ground, and withdraw the implement from the hole formed in the ground.

It is to be understood that the implement is designed and dimensioned so that the hand grip 34 is disposed at a convenient operating height for use by a person in a standing or upright position. It will now be apparent that the operator, in using the implement, may grasp the hand grip 34 and quickly position the lower end of the implement with relation to the base or trunk of a tree or shrub to be fertilized, and while in a standing position, quickly and easily form a hole in the ground and upon lifting of the implement from the ground by the hand grip 34, effect a discharge of a predetermined, measured quantity of the granular material into the formed hole. Thus it is possible to quickly and easily perform the operations of treating trees and shrubs with suitable fertilizer or like material in a manner which eliminates fatigue and strain upon the operator, while simultaneously effecting a great saving in time.

While I have shown the relation of the parts of the implement to be such that the extreme end of the cone valve element 26 is caused to be projected into the ground prior to said element closing its valve port 21, it is to be understood that the parts may be reproportioned as to insure closure of the port 21, prior to the valve element 26 entering the ground.

Modification

Figure 7 of the drawings represents a slight modification of the measuring chamber and valve assembly. In this construction the lower end of the spout indicated at 50, is threaded and the upper end of the chambered body indicated at 51, is likewise threaded and the two parts are connected together by a coupling nut 52, with a disc shaped valve element 53 interposed between the adjacent ends of the spout and chambered body. The disc element 53 is provided with a central port opening 54, and the lower end of the chambered body 51 is of frusto-conical form, and is provided at its lower end with a port opening 55. Co-operating with the ports 54 and 55, is a unitary dual valve member 57, the upper end of which as indicated at 58, is formed to cooperate with the port 54, and the lower portion indicated at 59, is of tapered conical form, adapted to cooperate with the lower valve port 55, and is dimensioned so that when the operating rod 60, on which the dual valves are carried, is projected downwardly, the lower end of the tapered valve member 59 will close the port 55, and will have the lower portion projecting a substantial distance below the chambered body 51, and in effect constituting a continuation of the frusto-conical wall of said chambered body 51. Surrounding the chambered body, and disposed therebelow is a resilient foot, as above described, comprising a coil spring 62, frictionally secured around the upper portion of the chambered body 51, and the lower end thereof being connected to an annular ground engaging member 63. The operation of this modified construction may be understood to be the same as above described with respect to the construction represented in Figures 1 to 6 of the drawings.

Although I have herein shown and described certain preferred embodiments of my invention, manifestly it is capable of modification and rearrangement of parts without departing from the spirit and scope thereof. I do not, therefore, wish to be understood as limiting this invention to the precise embodiment herein disclosed, except as I may be so limited by the appended claims.

I claim as my invention:

1. In a portable, hand operated implement of the character indicated, the combination of a material storage hopper, a depending tubular spout in open communication at its upper end with the bottom of the hopper, means connected to the lower end of the spout and constituting a material measuring chamber, said means comprising a valve seat element constituting the upper end of the chamber and disposed adjacent the lower end of the spout, and a tubular body terminating at its lower end in a frusto-conical wall, providing a second valve seat, a manually reciprocable operating rod extending downwardly through the hopper, the spout and into the measuring chamber, dual valve means on the rod, within the chamber, and normally cooperable alternately with said valve seats, incident to movement of the rod, the valve cooperating with the second seat including a tapered cone portion adapted to be projected through the second seat opening and substantially constituting an extension of the frusto-conical wall of the tubular body, resilient means connected to said means on the lower end of the spout and including portions extending a substantial distance therebelow for seating upon the ground for initially supporting the implement preparatory to operation thereof, and a handle connected to the upper end of said rod for actuating the valve means and serving as the pressure applying medium for forming a hole in the ground by the valve means and said means connected to the lower end of the spout, and for lifting the implement from said formed hole and simultaneously discharging a measured quantity of material into said hole.

2. In a portable, hand operated implement of the character indicated, the combination of a material storage hopper, a depending tubular spout in open communication at its upper end with the bottom of the hopper, means connected to the lower end of the spout and constituting a material measuring chamber, said means comprising a valve seat element constituting the upper end of the chamber and disposed adjacent the lower end of the spout, and a tubular body terminating at its lower end in a frusto-conical wall, providing a second valve seat, a manually reciprocable operating rod extending downwardly through the hopper, the spout and into the measuring chamber, dual valve means on the rod, within the chamber, and normally cooperable alternately with said valve seats, incident to movement of the rod, the valve cooperating with the second seat including a tapered cone portion adapted to be projected through the second seat opening and substantially constituting an extension of the frusto-conical wall of the tubular body, resilient means connected to said tubular body and extending a substantial distance therebelow, a foot connected to the lower end of said resilient means for seating upon the ground for initially supporting the implement preparatory to operation thereof, said foot including an opening for accommodating said frusto-conical wall of the tubular body and said tapered cone portion of the valve element when projected through the valve seat opening in said frusto-conical wall, when the implement is being operated, and a handle connected to the upper end of said rod for actuating the valve means and serving as the pressure applying medium for forming a hole in the ground by the valve means and said means connected to the lower end of the spout, and for lifting the implement from said formed hole and simultaneously discharging a measured quantity of material into said hole.

3. In a portable, hand operated implement of the character indicated, the combination of a material storage hopper, a depending tubular spout in open communication at its upper end with the bottom of the hopper, means connected to the lower end of the spout and constituting a material measuring chamber, said means comprising a valve seat element constituting the upper end of the chamber and disposed adjacent the lower end of the spout, and a tubular body terminating at its lower end in a frusto-conical wall, providing a second valve seat, a manually reciprocable operating rod extending downwardly through the hopper, the spout and into the measuring chamber, dual valve means on the rod, within the chamber, and normally cooperable alternately with said valve seats, incident to movement of the rod, the valve cooperating with the second seat including a tapered cone portion adapted to be projected through the second seat opening and substantially constituting an extension of the frusto-conical wall of the tubular body, a coil spring frictionally mounted at one end on said tubular body and extending a substantial distance therebelow, a foot connected to the lower end of the spring for seating on the ground whereby to initially support the implement preparatory to operation thereof, said foot having an opening aligned with the interior of the spring for accommodating said frusto-conical wall of the tubular body and said tapered cone portion of the valve element when projected through the valve seat opening in said wall, when the implement is being operated, and a handle connected to the upper end of said rod for actuating the valve means and serving as the pressure applying medium for forming a hole in the ground by the valve means and said means connected to the lower end of the spout, and for lifting the implement from said formed hole and simultaneously discharging a measured quantity of material into said hole.

4. In a portable, hand operated implement of the character indicated, the combination of a material storage hopper, a depending tubular spout in open communication with the bottom of the hopper; means associated with the lower end of the spout for dispensing measured quantities of said material, said means comprising a chambered body having valve ports at upper and lower ends thereof, the upper port being in communication with the spout, reciprocably movable valve means including a valve element for cooperating with the upper port and a member for controlling the lower port and having a portion adapted to be projected through the latter port, hand operated means connected to the valve means for raising and lowering it, whereby in operation downward movement of said valve means by exertion of downward pressure on said hand operated means effects closing of the lower port and opening of the upper port to admit material to said chamber and causes the projecting portion of said member to be forced into the ground to form a hole therein, and upward movement of the valve means by upward pressure on the hand operated means opens the lower port and closes the upper port and simultaneously discharges the material in said chamber through said lower port in said hole formed in the ground, and resilient means connected to the lower end of the spout and extending a substantial distance therebelow for seating upon the ground for initially supporting the implement preparatory to operation of said hand operated means.

ANTHONY W. MOLINARE.